(12) United States Patent
Kikinis

(10) Patent No.: US 8,341,676 B1
(45) Date of Patent: Dec. 25, 2012

(54) METHOD AND SYSTEM FOR PERFORMING AN ALPHABETIC SEARCH USING A SINGLE APPLICATION OF KEYS

(75) Inventor: Dan Kikinis, Saratoga, CA (US)

(73) Assignee: JLB Ventures LLC., Washington, DC (US)

( * ) Notice: Subject to any disclaimer, the term of this patent is extended or adjusted under 35 U.S.C. 154(b) by 2554 days.

(21) Appl. No.: 09/996,456

(22) Filed: Nov. 28, 2001

Related U.S. Application Data

(60) Provisional application No. 60/250,980, filed on Dec. 2, 2000.

(51) Int. Cl.
*H04N 5/445* (2006.01)

(52) U.S. Cl. ............................................ 725/53; 725/52

(58) Field of Classification Search ........ 707/5; 725/45, 725/53, 52
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,263,174 A * | 11/1993 | Layman | 715/841 |
| 5,337,347 A * | 8/1994 | Halstead-Nussloch et al. | 379/88.14 |
| 5,412,720 A * | 5/1995 | Hoarty | 380/211 |
| 5,414,773 A | 5/1995 | Handelman | |
| 5,479,268 A | 12/1995 | Young et al. | |
| 5,485,197 A | 1/1996 | Hoarty | |
| 5,526,034 A | 6/1996 | Hoarty | |
| 5,532,754 A | 7/1996 | Young et al. | |
| 5,550,576 A | 8/1996 | Klosterman | |
| 5,550,578 A | 8/1996 | Hoarty | |
| 5,629,733 A * | 5/1997 | Youman et al. | 725/53 |
| 5,684,525 A | 11/1997 | Klosterman | |
| 5,686,954 A * | 11/1997 | Yoshinobu et al. | 725/43 |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,751,282 A | 5/1998 | Girard et al. | |
| 5,808,613 A | 9/1998 | Marrin et al. | |

(Continued)

FOREIGN PATENT DOCUMENTS

GB 2325537 A 11/1998

(Continued)

OTHER PUBLICATIONS

Canadian Patent Application No. 2436913, Office Action dated Oct. 22, 2010.

*Primary Examiner* — James R Sheleheda

(74) *Attorney, Agent, or Firm* — Banner & Witcoff Ltd.

(57) ABSTRACT

A method and system for performing an alphabetic search using a single application of keys is disclosed. In one embodiment, a method for selecting a program title using an alphanumeric keypad, comprises gathering one or more searchable items from a broadcast source; generating a dynamic directory of the one or more searchable items by a set-top box; narrowing the scope of the dynamic directory upon receiving a narrowing command from the keypad; receiving a partial program title from the keypad at the set-top box; returning a list of possible selections by the set-top box, wherein the list includes the program title; and receiving a subselector key selector signal from the keypad at the set-top box, wherein the subselector key selector signal selects the program title.

18 Claims, 3 Drawing Sheets

U.S. PATENT DOCUMENTS

| | | | |
|---|---|---|---|
| 5,812,124 A | 9/1998 | Eick et al. | |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,018,372 A * | 1/2000 | Etheredge | 725/44 |
| 6,029,195 A | 2/2000 | Herz | |
| 6,034,678 A | 3/2000 | Hoarty | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,100,883 A | 8/2000 | Hoarty | |
| 6,133,909 A * | 10/2000 | Schein et al. | 715/721 |
| 6,167,188 A | 12/2000 | Young et al. | |
| 6,205,485 B1 | 3/2001 | Kikinis | |
| 6,205,582 B1 | 3/2001 | Hoarty | |
| 6,233,389 B1 | 5/2001 | Barton et al. | |
| 6,243,039 B1 | 6/2001 | Elliot | |
| 6,271,831 B1 | 8/2001 | Escobosa et al. | |
| 6,370,518 B1 * | 4/2002 | Payne et al. | 707/1 |
| 6,421,672 B1 * | 7/2002 | McAllister et al. | 707/10 |
| 6,557,004 B1 * | 4/2003 | Ben-Shachar et al. | 707/102 |
| 6,876,901 B2 * | 4/2005 | DiLorenzo | 700/231 |
| 7,096,185 B2 | 8/2006 | Reichardt et al. | |
| 7,426,467 B2 | 9/2008 | Nashida et al. | |
| 2003/0014753 A1 * | 1/2003 | Beach et al. | 725/53 |
| 2005/0278741 A1 * | 12/2005 | Robarts et al. | 725/46 |

FOREIGN PATENT DOCUMENTS

| | | |
|---|---|---|
| JP | 410093880 A | 4/1998 |
| WO | WO 00/01149 A1 | 1/2000 |

* cited by examiner

METHOD AND SYSTEM FOR PERFORMING AN ALPHABETIC SEARCH USING A SINGLE APPLICATION OF KEYS

This patent claims priority based on U.S. Provisional Patent Application Ser. No. 60/250,980, filed on Dec. 2, 2000, incorporated herein by reference.

FIELD OF THE INVENTION

The present invention relates generally to the field of video processing systems, and, more specifically, to a method and system for performing an alphabetic search using a single application of keys.

BACKGROUND OF THE INVENTION

When entering words for searches of a database of video program titles, very often the user is required to type in quite a long character string. Such a requirement can be very cumbersome and tedious when a person is using a numeric keypad, such as those found on most small hand-held electronic communication devices such as a numeric keypad on a TV remote control device.

One method that is very common in current art is the method that is used, for example, in applications such as a voice mail system. Such a system allows a caller to search a directory by the names of parties in the private branch exchange. In this application, the user would begin pressing numbers on the keypad, where each number is associated with up to three alphabetic characters. As soon as enough numbers on the keypad are pressed, the directory software can match the possible alphabetic combinations with a unique character string, for example a last name, currently listed in the directory, which is very limited in size (typically a few dozen names). If more than one selection applies, for example, if two people have a very short last name, such as "Hong," then a sub-selection is offered, for example, directions to "press 1 for Martin Hong or press 2 for Susan Hong." This method is essentially a very easy way to enter alphabetic characters using a numeric keypad.

Another application of using numeric keys to enter alphabetic characters is entering unlimited, undefined character strings, for example, names associated with telephone numbers in the memory of a communication device such as, for example, a cell phone. In this method, however, multiple keystrokes are required to enter the alphabetic string. For example, to spell the name "Dan," the user may have to press 3 once, then 2 once, then 6 twice in quick succession, because N is the second character on the number 6 key.

The distinction between the first and the second application is that the first application has a very limited directory of words that can be entered; namely, the names in the directory of the phone system users, which is a fixed, defined directory. However, in the second application, multiple keystrokes are required to identify which of multiple characters are desired to create any undefined character string.

SUMMARY OF THE INVENTION

A method and system for performing an alphabetic search using a single application of keys is disclosed. In one embodiment, a method for selecting a program title using an alpha-numeric keypad, comprises gathering one or more searchable items from a broadcast source; generating a dynamic directory of the one or more searchable items by a set-top box; narrowing the scope of the dynamic directory upon receiving a narrowing command from the keypad; receiving a partial program title from the keypad at the set-top box; returning a list of possible selections by the set-top box, wherein the list includes the program title; and receiving a subselector key selector signal from the keypad at the set-top box, wherein the subselector key selector signal selects the program title.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
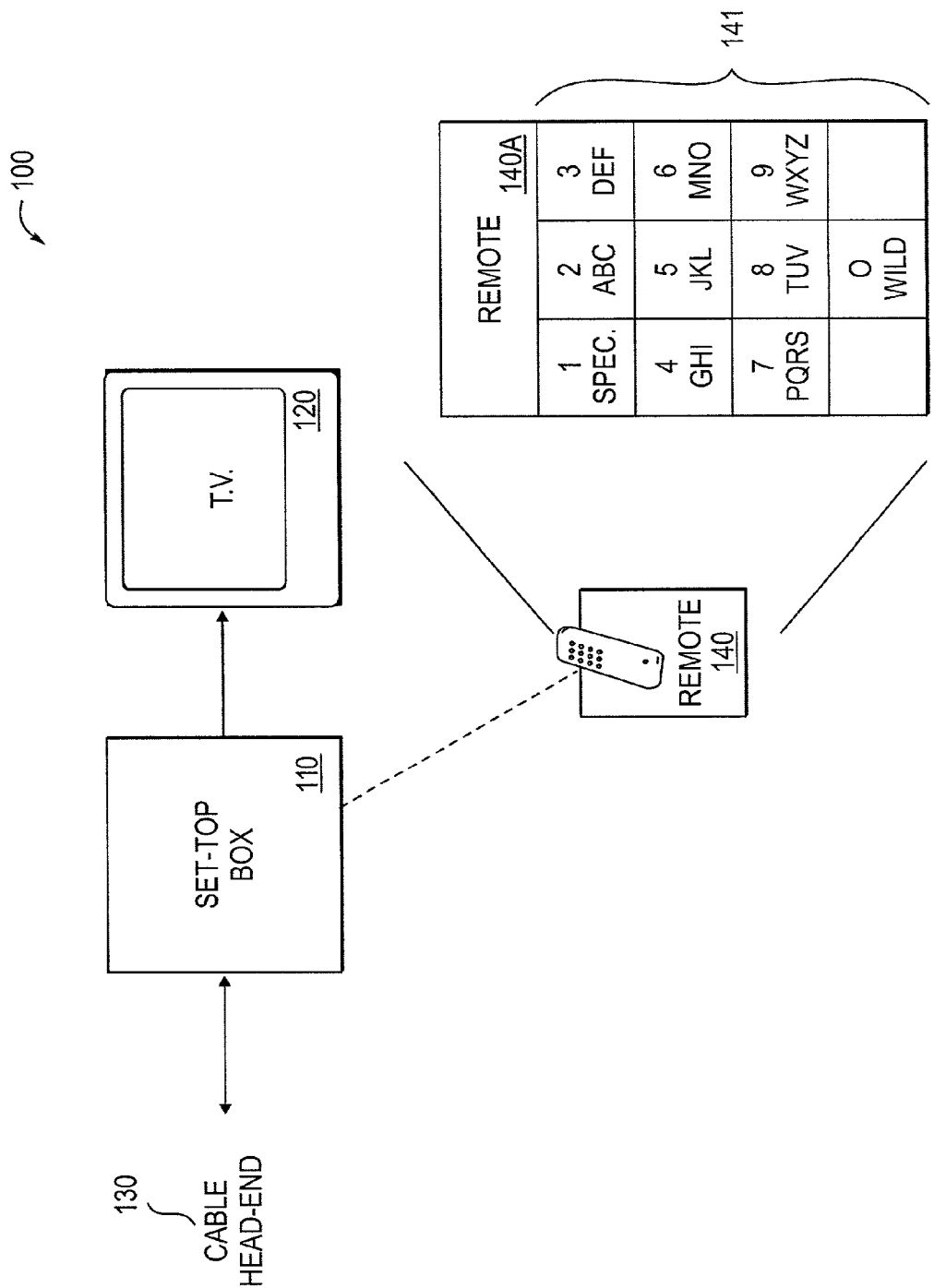
FIG. 1 illustrates an exemplary digital television system embodying features of the present method and system.

A method and system for performing an alphabetic search using a single application of keys, is described. In one embodiment, a method for selecting a program title using an alpha-numeric keypad, comprises gathering one or more searchable items from a broadcast source; generating a dynamic directory of the one or more searchable items by a set-top box; narrowing the scope of the dynamic directory upon receiving a narrowing command from the keypad; receiving a partial program title from the keypad at the set-top box; returning a list of possible selections by the set-top box, wherein the list includes the program title; and receiving a subselector key selector signal from the keypad at the set-top box, wherein the subselector key selector signal selects the program title.

In the following description, for purposes of explanation, numerous specific details are set forth in order to provide a thorough understanding of the present invention. It will be evident, however, to one skilled in the art that the present invention may be practiced without these specific details.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention. It is to be understood that other embodiments may be utilized and that logical, software, re-ordering of steps, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm as described here, is generally conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

In the present method and system, a dynamic directory is assembled out of searchable items, for example titles of shows that are broadcast in the broadcast system, from all the titles and words currently available for selection of video programs. It's not a fixed directory. It's dynamically built, based on the current available selections. Besides program titles, genres, textual descriptions, abstracts or any other type of searchable items of information available may be also searched. But those selections may change, and the scope of the selections may be changed by previous narrowing selections that would reduce the pool of words from which selections may be offered, such as, for example, looking only for comedies between 6 p.m. and 11 p.m. In this example, a new directory would be created dynamically, as the selection for comedy is made, that includes only the titles of shows marked as comedy. Then, as the time range is being input, the directory would be further reduced to only include titles of those comedies in that time slot. Hence a very targeted one-stroke-per-character approach can be successful, even though technically the directory is unlimited because any new words that would come into the pool would be immediately included in any applicable selections.

FIG. 1 illustrates an exemplary digital television system embodying features of the present method and system. System 100 includes a set-top box 110, a television 120, a cable head-end 130, and a remote controller 140.

A set-top box 110 is a device that in one embodiment enables a television set 120 to become a user interface to the Internet and/or also enables the television set 120 to receive and decode digital television (DTV) broadcasts. Set-top box 110 may be a DTV set-top boxes which is sometimes called a receiver. Set-top box 110 allows television viewers who wish to use their current analog television sets to receive digital broadcasts. It is estimated that 35 million homes will use digital set-top boxes 110 by the end of 2006, the estimated year ending the transition to DTV.

In the Internet realm, a set-top box 110 is really a specialized computer that can "talk to" the Internet—that is, it contains a Web browser (which is really a Hypertext Transfer Protocol client) and the Internet's main program, TCP/IP. The service to which the set-top box is attached may be through a telephone line as, for example, with WebTV, or through a cable TV company. Digital television set-top boxes 110 are used for satellite, cable, and terrestrial DTV services.

Television 120 is the viewing device through which a viewer may watch and/or listen to programming provided via the set-top box 110. Television 120 may include monitors, flat screen televisions, projection screens, traditional Cathode Ray Tube (CRT) televisions, Liquid Crystal Display (LCD) televisions, or similar viewing devices.

Cable head-end 130 is the facility at a local cable TV office that originates and communicates cable TV services and cable modem services to subscribers. In distributing cable television services, the head-end includes a satellite dish antenna for receiving incoming programming. This programming is then passed on to the subscriber. (Cable TV companies may also play videotapes and originate live programming.) Normally, all signals are those that are sent downstream to the subscriber, but some are received upstream such as when a customer requests a pay-per-view program. In another embodiment, a digital program feed is provided via a satellite communications system.

Remote control 140 is used to interact with set-top box 110 and may also interact with television 120. Remote control 140A is an expanded view of remote control 140 that illustrates a key pad used in one embodiment of the present invention. Key-pad 141 has keys 0-9 with alphabetic characters associated with each key, for example key 2 has the letters "A", "B", and "C" associated with it. The keys may be pressed to generate the alphabetic characters. Remote control 140 may also have functions associated with it that are not shown on the remote control 140, but are contemplated to be within the scope of the present invention.

Figure 2:
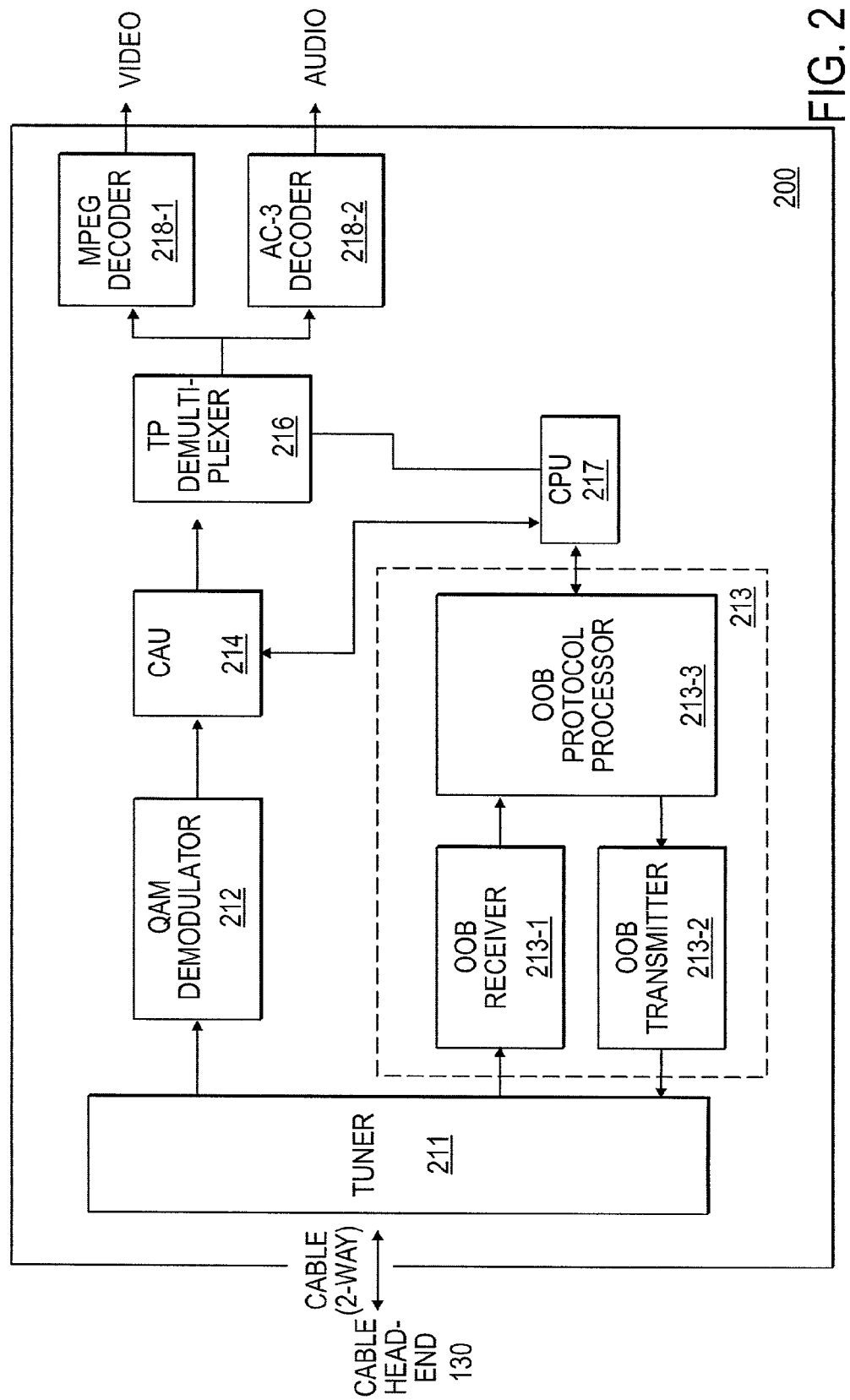
FIG. 2 illustrates an exemplary architecture 200 of a set-top box used to implement the present method.

FIG. 2 illustrates an exemplary architecture 200 of a set-top box used to implement the present method. The digital cable set-top box architecture 200 performs bi-directional communication with the cable head-end 130 in a manner that it receives an A/V broadcast program from the cable head-end 130 through an in-band (IB), and transmits a viewer's request to the cable head-end 130 through an out of band (OOB) and receives a corresponding service to be displayed.

As shown in FIG. 2, a digital cable set-top box 200 includes a tuner 211 for tuning a receive frequency to be able to receive an A/V broadcast program corresponding to a frequency of a channel desired by a user from a cable head-end 130; a QAM (Quadrature Amplitude Modulation) demodulator 212 for receiving and demodulating an A/V broadcast program tuned by the tuner 211; a conditional access unit (CAU) 214 for receiving the demodulated signal from the QAM demodulator 212 according to a pre-set condition; a TP (transport) demultiplexer 216 for processing the signal outputted from the CAU 214 and outputting a data stream; an MPEG decoder 218-1 and an AC-3 decoder 218-2 for decoding the data stream outputted from the TP demultiplexer 216 and outputting video signals and audio signals; an OOB processing unit 213 for receiving the broadcast program information such as a channel tuning or a program guidance from the tuner 211 through the OOB and processing it; and a CPU 217 for receiving the signal processed by the OOB processing unit 213 and controlling the CAU 214 and the TP demultiplexer 216.

The OOB processing unit 213 includes an OOB receiver 213-1 for receiving the signal outputted from the tuner 211; an OOB protocol processor 213-3 for processing a protocol of the signal processed by the OOB receiver 213-1 and outputting it to the CPU 217; and an OOB transmitter 213-2 for processing the signal outputted from the OOB protocol processor 213-3 and outputting it to the tuner 211.

When power is supplied to the digital cable set-top box 200, the tuner 211 receives an A/V broadcast program signal from the cable head-end 130, tunes its frequency so as for a user to receive the A/V broadcast program, and outputs the tuned A/V broadcast program signal to the QAM demodulator 212.

Then, the QAM demodulator 212 QAM-demodulates the A/V broadcast program signal and the QAM-demodulated signal to the CAU 214.

After the CAU 214 receives the QAM-demodulated signal, in case that the QAM-demodulated signal is in an scrambled state, the CAU 214 descrambles the QAM-demodulated signal according to a conditional access key (CAK) outputted from the CPU 217 and outputs it to the TP demultiplexer 216.

Then, the TP demultiplexer 216 separates a video packet and an audio packet of the descrambled signal and outputs them to the video decoder 218-1 and the audio decoder 218-2.

The video decoder 218-1 clears an over head (i.e., various header information or starting code, etc.) from the video packet and performs variable-length decoding (VLD) for the pure data information. Then, the decoded information undergoes inverse-quantizing, inverse-discrete cosine transforming and motion compensating using a motion vector, is restored as a pixel value of the original screen and outputted to the monitor.

The audio decoder 218-2 decodes the audio packet and outputs it to a speaker, by using an AC-3 algorithm.

Subscriber managing server systems connected with the cable head-end 130 manages subscribers, receives subscriptions from subscribers who desire to receive a paid program provided for a paid TV or a paper view and transmits information corresponding to the paid program to the subscribers, and manages and operates the network on the whole.

When the subscriber registers at the subscriber managing server system, he or she is given a password from the subscriber managing server system. The paid program is provided from the cable head-end 130 to the set-top box 200 as the subscriber inputs the password to his or her set-top box 200.

The subscriber managing server system renders the cable head-end 130 to transmit a diagnosis command signal to the set-top box 200, thereby diagnosing the operation state of the subscriber's set-top box 200. That is, when the OOB receiver of the set-top box 200 receives the diagnosis command signal from the cable head-end 130, the set-top box 200 operates its own self-diagnosis program to diagnose whether there is an error in each circuit unit of the set-top box 200 and transmits the diagnosis result to the cable head-end 130 through the OOB transmitter.

Upon receipt of the diagnosis result of the set-top box 200, the cable head-end 130 transmits the diagnosis result to the subscriber managing server system and receives an instruction from the subscriber managing server system as necessary.

In the DTV realm, a typical digital set-top box 200 contains one or more microprocessors for running the operating system, possibly Linux or Windows CE, and for parsing the MPEG transport stream. In alternate embodiments, the contents of set-top box 200 depend on the DTV standard used. For example, European DVB-compliant set-top boxes contain parts to decode COFDM transmissions while ATSC-compliant set-top boxes contain parts to decode VSB transmissions. More sophisticated set-top boxes contain a hard drive for storing recorded television broadcasts, for downloaded software, and for other applications provided by a DTV service provider.

Figure 3:
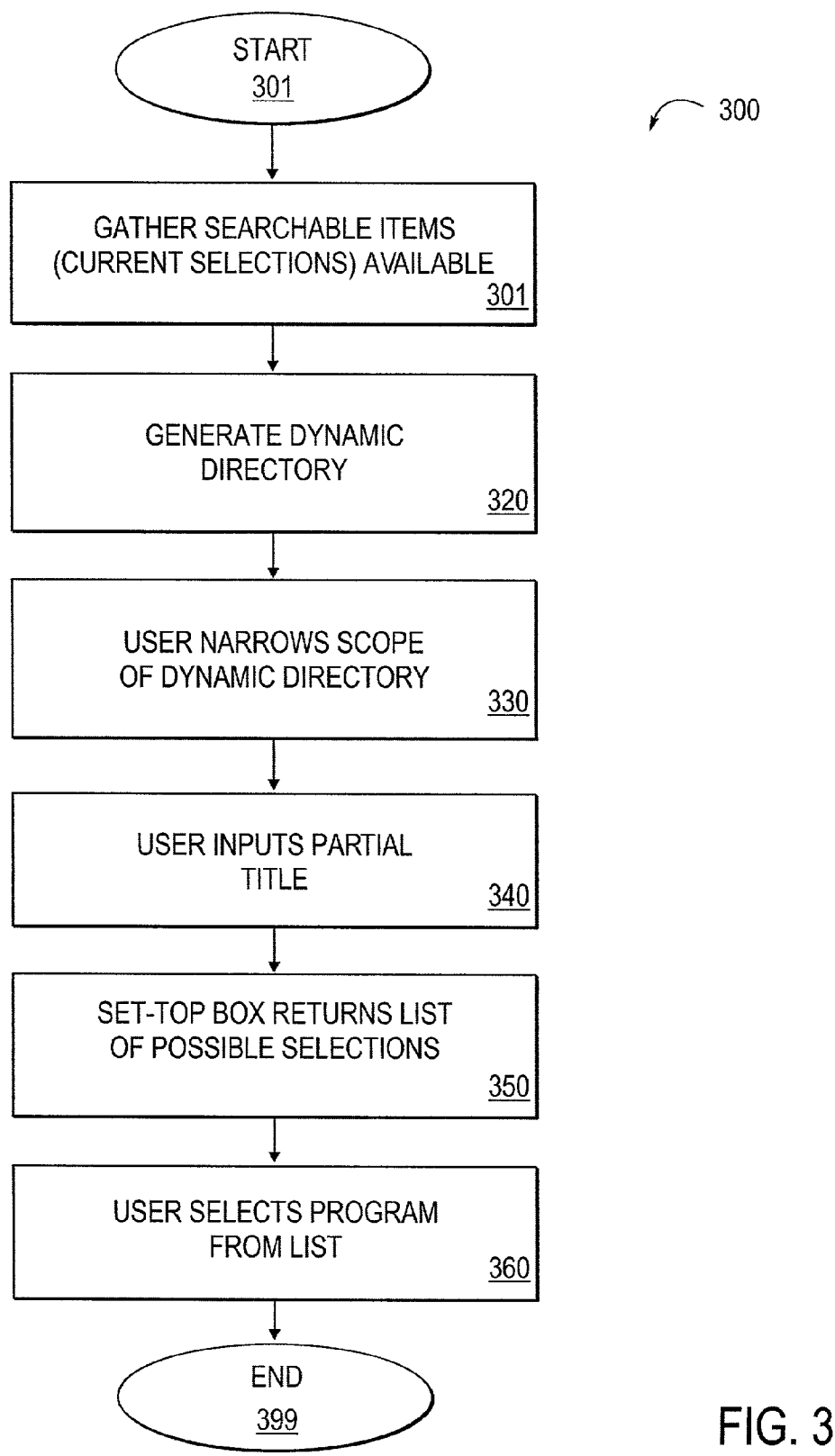
FIG. 3 illustrates an exemplary flow chart of the present method for performing an alphabetic search using a single application of keys.

FIG. 3 illustrates an exemplary flow chart of the present method for performing an alphabetic search using a single application of keys. In one embodiment, the present method and system is used to select a broadcast television program from hundreds of programs offered to a viewer, either through satellite television or cable broadcast. The process 300 may be used for selecting a program title, for example, the title "For the Love of the Game." The process commences at start block 301.

At processing block 310, cable head-end 130 provides guide data regarding the searchable items to set-top box 110. Flow continues to processing block 320 where a dynamic directory is assembled out of the searchable items, for example titles of shows that are broadcast in the broadcast system, from all the titles and words currently available for selection of video programs. It's not a fixed directory. It's dynamically built, based on the current available selections. Besides titles, genres, textual descriptions, abstracts or any other type of information available may be also searched.

At processing block 330, the scope of the selections in the dynamic directory may be changed by reducing the pool of words (i.e. titles, genres, textual descriptions, abstracts, times etc.) from which selections may be offered. For example, the dynamic directory could be narrowed by a narrowing command generated from the remote 140 that looks only for comedies between 6 p.m. and 11 p.m. In this example, a new directory would be created dynamically, as the selection for comedy is made, that includes only the titles of shows marked as comedy. Then, as the time range is being input, the directory would be further reduced to only include titles of those comedies in that time slot. Hence a very targeted one-stroke-per-character approach can be successful, even though technically the directory is unlimited because any new words that would come into the pool would be immediately included in any applicable selections.

Flow continues to processing block 340, where the user inputs a partial title of a program contained in the narrowed dynamic directory using the remote 140. So to select the title "For the Love of the Game" the buttons entered by the user on remote control 140 is "5683," which spells "love" in this case; then a 1 for the special character (the slash); then 4263, which spells "game."

Alternatively, the user might spell only 5683, then a zero, which is a wild card, directing the programming guide software to list anything that begins with "love" followed by any other characters. In this case, set-top box 110 returns a list of possible selections to the user, wherein the list of possible selections contains the desired program and displays the list on television 120. At processing block 360, the user can then press a subselector key and generate a subselector key selector signal, for example a 1 or 2, to choose from the list of selections returned by this search the desired program. Upon selection of a single program, the process completes at block 399. The instructions for performing process 300 may be stored in memory (i.e. RAM—not shown) that services CPU 217, which executes the instructions for performing an alphabetic search using a single application of keys.

This method presents a very effective algorithm for using very few keystrokes to input search parameters in a search system with an unlimited search directory.

Thus, a method and system for performing an alphabetic search using a single application of keys have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for selecting a program title, comprising:
   generating a dynamic directory of one or more searchable items, wherein the items correspond to a list of currently available programs from a broadcast source;
   receiving a narrowing command from an alpha-numeric keypad comprising a plurality of number buttons, the narrowing command corresponding to one or more of a program genre, text description, abstract, and time range;
   narrowing the scope of the dynamic directory based on the narrowing command;
   receiving numeric input from the keypad corresponding to a user selection of one or more of the plurality of number buttons, wherein each of the plurality of number buttons is permanently associated with a distinct set of letters of an alphabet;
   determining based on the numeric input a string comprising one or more letters corresponding to a partial program title;
   identifying a subset of the programs in the narrowed dynamic directory matching the partial program title;
   displaying the matching subset of programs, wherein each program in the subset is visually associated with a numerical value in the display; and
   receiving a numerical value selection from the keypad and selecting the program from the subset of programs associated with selected numerical value.

2. The method according to claim 1, wherein the searchable items include titles, genres, textual descriptions, abstracts, and times.

3. The method of claim 1, wherein the subset of matching programs comprises one or more programs with multiple word titles wherein a word other than the first word in the title matches the received partial program title.

4. The method of claim 1, wherein the string corresponding to the partial program title comprises a wildcard character.

5. The method of claim 1, wherein the plurality of number buttons is associated with the letters of the alphabet such that every letter of the alphabet is permanently associated with exactly one number button.

6. The method of claim 1, wherein the keypad comprises an additional number button not in the plurality of number buttons, the additional number button associated with a wildcard character.

7. A system for selecting a program title, comprising:
   means for generating a dynamic directory of one or more searchable items, wherein the items correspond to a list of currently available programs from a broadcast source;
   means for receiving a narrowing command from an alpha-numeric keypad comprising a plurality of number buttons, the narrowing command corresponding to one or more of a program genre, text description, abstract, and time range;
   means for narrowing the scope of the dynamic directory based on the narrowing command;
   means for receiving numeric input from the keypad corresponding to a user selection of one or more of the plurality of number buttons, wherein each of the plurality of number buttons is permanently associated with a distinct set of letters of an alphabet;
   means for determining based on the numeric input a string comprising one or more letters corresponding to a partial program title;
   means for identifying a subset of the programs in the narrowed dynamic directory matching the partial program title;
   means for displaying the matching subset of programs, wherein each program in the subset is visually associated with a numerical value in the display; and
   means for receiving a numerical value selection from the keypad and selecting the program from the subset of programs associated with selected numerical value.

8. The system according to claim 7, wherein the searchable items include titles, genres, textual descriptions, abstracts, and times.

9. The system according to claim 7, wherein the string corresponding to the partial program title comprises a wildcard character.

10. A computer-readable medium having stored thereon a plurality of instructions for selecting a program title, said plurality of instructions when executed by a computer, cause said computer to perform:
   generating a dynamic directory of one or more searchable items, wherein the items correspond to a list of currently available programs from a broadcast source;

receiving a narrowing command from an alpha-numeric keypad comprising a plurality of number buttons, the narrowing command corresponding to one or more of a program genre, text description, abstract, and time range;

narrowing the scope of the dynamic directory based on the narrowing command;

receiving numeric input from the keypad corresponding to a user selection of one or more of the plurality of number buttons, wherein each of the plurality of number buttons is permanently associated with a distinct set of letters of an alphabet;

determining based on the numeric input a string comprising one or more letters corresponding to a partial program title;

identifying a subset of the programs in the narrowed dynamic directory matching the partial program title;

displaying the matching subset of programs, wherein each program in the subset is visually associated with a numerical value in the display; and receiving a numerical value selection from the keypad and selecting the program from the subset of programs associated with selected numerical value.

11. The computer-readable medium of claim 10 wherein the searchable items include titles, genres, textual descriptions, abstracts, and times.

12. The computer-readable medium of claim 10, wherein the string corresponding to the partial program title comprises a wildcard character.

13. An electronic device, comprising:

a processor controlling operations of the electronic device; and a storage device configured to store computer executable instructions that, when executed by the processor, cause the electronic device to perform a method comprising:

generating a dynamic directory of one or more searchable items, wherein the items correspond to a list of currently available programs from a broadcast source;

receiving a narrowing command from an alpha-numeric keypad comprising a plurality of number buttons, the narrowing command corresponding to one or more of a program genre, text description, abstract, and time range;

narrowing the scope of the dynamic directory based on the narrowing command;

receiving numeric input from the keypad corresponding to a user selection of one or more of the plurality of number buttons, wherein each of the plurality of number buttons is permanently associated with a distinct set of letters of an alphabet;

determining based on the numeric input a string comprising one or more letters corresponding to a partial program title;

identifying a subset of the programs in the narrowed dynamic directory matching the partial program title;

displaying the matching subset of programs, wherein each program in the subset is visually associated with a numerical value in the display; and receiving a numerical value selection from the keypad and selecting the program from the subset of programs associated with selected numerical value.

14. The electronic device of claim 13, wherein the searchable items include titles, genres, textual descriptions, abstracts, and times.

15. The electronic device of claim 13, wherein the subset of matching programs comprises one or more programs with multiple word titles wherein a word other than the first word in the title matches the received partial program title.

16. The electronic device of claim 13, wherein the string corresponding to the partial program title comprises a wildcard character.

17. The electronic device of claim 13, wherein the plurality of number buttons is associated with the letters of the alphabet such that every letter of the alphabet is permanently associated with exactly one number button.

18. The electronic device of claim 13, wherein the keypad comprises an additional number button not in the plurality of number buttons, the additional number button associated with a wildcard character.

* * * * *